United States Patent
Zhang et al.

(10) Patent No.: US 11,846,815 B2
(45) Date of Patent: Dec. 19, 2023

(54) ASSEMBLY FOR TRANSCEIVER MODULE OF FIBER-OPTIC COMMUNICATION NETWORK

(71) Applicant: II-VI Delaware, Inc, Wilmington, DE (US)

(72) Inventors: Grace Zhang, Shanghai (CN); Sharon Zeng, Shanghai (CN); Vincent Guan, Shanghai (CN)

(73) Assignee: II-VI DELAWARE, INC., Wilmington, DE (US)

(*) Notice: Subject to any disclaimer, the term of this patent is extended or adjusted under 35 U.S.C. 154(b) by 339 days.

(21) Appl. No.: 17/173,375

(22) Filed: Feb. 11, 2021

(65) Prior Publication Data

US 2022/0158735 A1 May 19, 2022

Related U.S. Application Data

(63) Continuation of application No. PCT/CN2020/128966, filed on Nov. 16, 2020.

(51) Int. Cl.
   *G02B 6/42* (2006.01)
   *H04B 10/40* (2013.01)
   (Continued)

(52) U.S. Cl.
   CPC ........... *G02B 6/4246* (2013.01); *G02B 6/125* (2013.01); *G02B 6/30* (2013.01); *G02B 6/3897* (2013.01);
   (Continued)

(58) Field of Classification Search
   CPC ...... G02B 6/125; G02B 6/30; G02B 6/12007; G02B 6/3829; G02B 6/3897;
   (Continued)

(56) References Cited

U.S. PATENT DOCUMENTS 6,215,917 B1  4/2001  Takahashi et al.
10,007,061 B2  6/2018  Jiang
(Continued)

FOREIGN PATENT DOCUMENTS

JP  2005004014 A  1/2005
JP  2005309259 A  11/2005
(Continued)

OTHER PUBLICATIONS

Finisar Transceivers, Transponders, and Actival Optical Cables, Apr. 2020, 5 pages.
(Continued)

*Primary Examiner* — Michael P Mooney
(74) *Attorney, Agent, or Firm* — Blank Rome LLP

(57) ABSTRACT

A planar lightwave circuit (PLC) assembly is used for a transceiver module that includes a circuit board having photodetectors mounted at a spacing from one another. A transmitter mounted on the circuit board is configured to transmit optical signals for a network. The PLC assembly includes at least one PLC chip and at least one fiber array. The PCL chip mounts on the transmitter and is configured to receive optical signals for the network. The fiber array has optical fibers connecting between the PLC chip and the photodetectors. The array's first end connected to the PLC chip has a first pitch between the optical fibers, while the array's second end has at least one connector connected adjacent the photodetectors and having a second fiber pitch, which is greater than the first pitch and is configured to the spacing of the photodetectors.

20 Claims, 4 Drawing Sheets

(51) Int. Cl.
*G02B 6/125* (2006.01)
*G02B 6/30* (2006.01)
*G02B 6/38* (2006.01)
*G02B 6/12* (2006.01)

(52) U.S. Cl.
CPC ............. *G02B 6/428* (2013.01); *H04B 10/40* (2013.01); *G02B 6/12007* (2013.01)

(58) Field of Classification Search
CPC .. G02B 6/4246; G02B 6/4278; G02B 6/4292; G02B 6/428; H04B 10/40
See application file for complete search history.

(56) References Cited

U.S. PATENT DOCUMENTS

| | | | |
|---|---|---|---|
| 10,545,302 B2 | 1/2020 | Koutrokois | |
| 2002/0114590 A1* | 8/2002 | Eichenberger | G02B 6/4246 385/89 |
| 2003/0091289 A1 | 5/2003 | Saito et al. | |
| 2003/0142946 A1 | 7/2003 | Saito et al. | |
| 2004/0114874 A1 | 6/2004 | Bono et al. | |
| 2017/0168252 A1 | 6/2017 | Pezeshki et al. | |
| 2019/0033542 A1 | 1/2019 | Epitaux et al. | |
| 2020/0081218 A1 | 3/2020 | Wu | |
| 2020/0386941 A1* | 12/2020 | Kang | G02B 6/4246 |

FOREIGN PATENT DOCUMENTS

| | | |
|---|---|---|
| JP | 2008225006 A | 9/2008 |
| JP | 5337931 B2 | 11/2013 |
| JP | 2018036636 A | 3/2018 |
| JP | 2020064211 A | 4/2020 |

OTHER PUBLICATIONS

Jou, et al., 400-GB/s optical transmitter and receiver modules for on-board interconnects using polymer waveguide arrays, QSA Continuum, 2018. 1:2:658-667.

Pluggable Finisar Transceivers for the Data Center, Apr. 2020, 6 pages.

QSFP-DD MSA QSFP-DD Hardware Specification for QSFP Double Density 8X Pluggable Transceiver, QSFP-DD Hardware Rev 5.0, 2019, 82 pages.

QSFP-DD800 Specification QSFP?DD specification for 800G operation, QSFP?DD800 Specification, 2020, 20 pages.

* cited by examiner

ASSEMBLY FOR TRANSCEIVER MODULE OF FIBER-OPTIC COMMUNICATION NETWORK

CROSS-REFERENCE TO RELATED APPLICATIONS

This application is a continuation application of International Patent Application No. PCT/CN2020/128966, filed Nov. 16, 2020, and entitled "Assembly for Transceiver Module of Fiber-Optic Communication Network." the entire contents of which are hereby incorporated by reference herein.

BACKGROUND OF THE DISCLOSURE

Optoelectronic modules are used in optoelectronic communications to connect optical cables between host devices in an optical network. A variety of hardware arrangements are available. For example, the optoelectronic module can be a pluggable device used with a cage and a connector.

The optoelectronic module converts optical and electronic data signals for a host device, which processes the electronic data signals. In general, the module, cage, and connector along with electrical signals, power supplies, mechanical and thermal requirements, and other details are subject to specific standards for particular form factors. One example form factor used in fiber-optic communications is a Quad Small Form-factor Pluggable (QSFP) and especially, the pluggable QSFP Double Density (QSFP-DD) module, connector, and cage system. This configuration offers a high density 8-channel (8×) module, cage and connector system, which supports up to 400 Gb/s in aggregate over an 8×50 Gb/s electrical interface.

Planar Lightwave Circuit (PLC) technology is widely used in current 100 G/200 G chip-on-board (COB) modules. However, the PLC chip is attached by glue on the printed circuit board (PCB) and must occupy space on the limited layout area of the board. As the art now stands, there is no solution for configuring a 800 G QSFP-DD chip-on-board (COB) product. A solution for 400 G QSFP-DD LR8 uses free space optics (golden box) instead of planar lightwave circuit (PLC) technology. However, the cost involved with these optics is much higher.

With advances continually occurring, fiber-optic communication networks are using ever increasing data rates. To increase data rates from the existing 100 G/200 G to 800 G and above, the layout space on the printed circuit boards for modules will drastically decrease because the integrated circuitry (having a digital signal processor (DSP), photodetectors, transimpedance amplifiers (TIA), etc.) necessarily has a larger size. Additionally, increased data rate of an assembly necessarily increases the optics required. For this reason, traditional designs for modules cannot be used for an assembly providing such increased data rates.

The subject matter of the present disclosure is directed to overcoming, or at least reducing the effects of, one or more of the problems set forth above.

SUMMARY OF THE DISCLOSURE

An assembly according to the present disclosure is used for communicating optical signals between a first optical port and a plurality of optoelectronic devices. The optoelectronic devices are disposed at a spacing from one another. The assembly comprises at least one at least one planar lightwave circuit (PLC), at least one fiber array, and at least one connector. The at least one PLC chip is in communication with the first optical port and has a plurality of second optical ports. The at least one PLC chip is configured to route the optical signals between the first optical port and the second optical ports. The at least one fiber array has a plurality of optical fibers and has first and second ends. The first end of the at least one fiber array is connected to the second optical ports of the at least one PLC chip and has a first pitch between the optical fibers. The at least one connector is disposed on the second end and is configured to mount adjacent the optoelectronic devices. The at least one connector has a second pitch between the optical fibers. The second pitch is greater than the first pitch and is configured to the spacing of the optoelectronic devices.

A module according to the present disclosure is used for communicating input and output optical signals of a network. The module comprises a circuit board, a plurality of photodetectors, a transmitter, at least one planar lightwave circuit (PLC) chip, a fiber array, and at least one connector. The circuit board has electronics mounted therein. The photodetectors are mounted on the circuit board at a spacing from one another. The photodetectors are in electrical communication with the electronics and are configured to detect the input optical signals. The transmitter is mounted on the circuit board. The transmitter is in electrical communication with the electronics and is configured to transmit the output optical signals.

The at least one PLC chip is disposed above the transmitter and is configured to route the input optical signals for the photodetectors. The at least one fiber array has a plurality of optical fibers. A first end of the at least one fiber array is connected to the at least one PLC chip and has a first pitch between the optical fibers. A second end of the at least one fiber array is connected adjacent the photodetectors and has a second pitch between the optical fibers. The second pitch is greater than the first pitch and is configured to the spacing of the photodetectors.

A transceiver according to the present disclosure is used for communicating input and output optical signals of a network. The transceiver comprises a housing, a circuit board, a plurality of photodetectors, a transmitter, at least one planar lightwave circuit (PLC) chip, at least one fiber array, and at least one connector. The housing is constrained by dimensions of a form factor. The housing has at least one optical input to communicate the input optical signals and at least one optical output to communicate the output optical signals. The circuit board is disposed in the housing and has a fixed surface area. The fixed surface area is constrained by the dimensions of the form factor. The circuit board has electronics mounted on a first portion of the fixed surface area.

The plurality of photodetectors are mounted on a second portion of the fixed surface area and are disposed at a spacing from one another. The photodetectors are in electrical communication with the electronics and are configured to detect the input optical signals. The transmitter is mounted on a third portion of the fixed surface area. The transmitter is in electrical communication with the electronics and is configured to transmit the output optical signals to the at least one optical output.

The at least one PLC chip is disposed above the transmitter on the third portion of the fixed area. The at least one PLC chip is configured to route the input optical signals from the at least one optical input to the photodetectors.

The at least one fiber array has a plurality of optical fibers disposed above the fixed surface area. The at least one fiber array has first and second ends. The first end of the at least one fiber array is connected to the at least one PLC chip and has a first pitch between the optical fibers. The at least one connector on the second end of the at least one fiber array is connected adjacent the photodetectors and has a second pitch between the optical fibers. The second pitch is greater than the first pitch and is configured to the spacing of the photodetectors.

The foregoing summary is not intended to summarize each potential embodiment or every aspect of the present disclosure.

DETAILED DESCRIPTION OF THE DISCLOSURE

Figure 1:
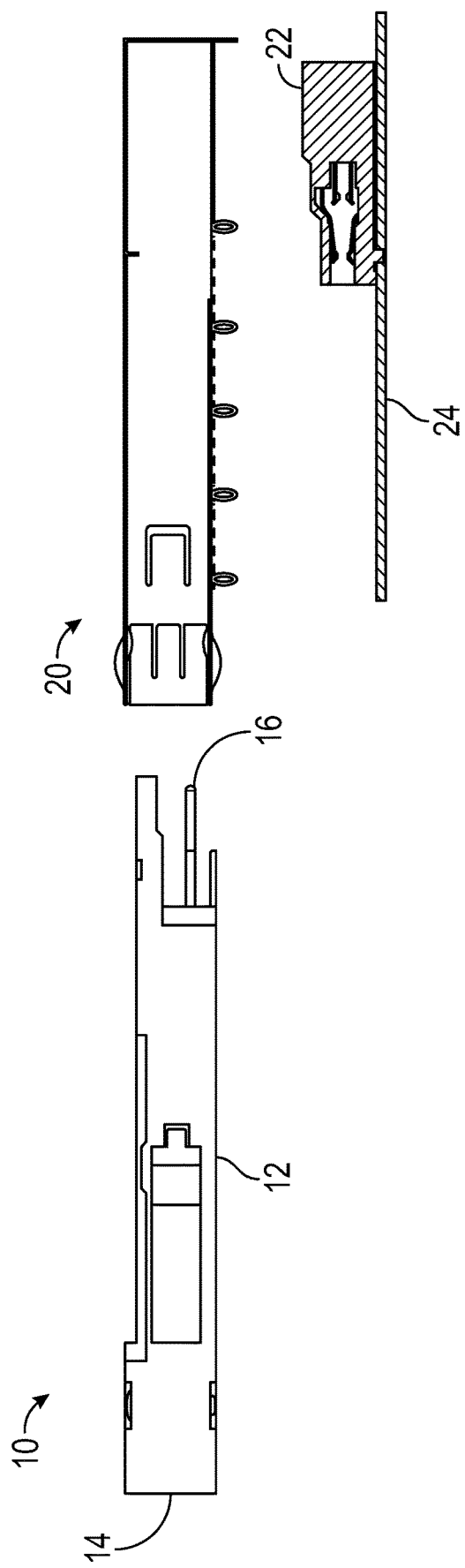
FIG. 1 illustrates an optoelectronic device having a pluggable module, a cage, and a connector.

As shown in FIG. 1, an optoelectronic module 10 of the present disclosure can be a pluggable device used with a cage 20 and a connector 22. The cage 20 is shown here unassembled to a base 24. The cage 20 is a press fit cage used with a surface mount connector 22, which connects to electronics of a host device (not shown). A variety of other hardware arrangements are available and can be used.

The module 10 has a housing 12, typically of standard form factor. One end 14 of the housing 12 includes one or more ports for connection to one or more optical fiber connectors, typically of standard dimensions and configurations. Internally, the optoelectronic module 10 includes a circuit board and a planar lightwave circuit (PLC) housed together in the housing 12 along with other components, such as lasers, photodetectors, digital signal processor, etc. The other end of the housing 12 has a paddle card 16 of the internal circuit board exposed, which can insert in the connector 22 and interface with the electrical connections for a host device.

The module 10 can perform transceiver functions. For transmission functions, the host device can provide outbound electronic data signals to the optoelectronic module 10 via the connector 22. The module 10 converts the electronic signals to outbound optical data signals for transmission across an optical network. For receiver functions, the optoelectronic module 10 can receive inbound optical data signals from the optical network and can convert them to inbound electrical data signals for the host device.

Figure 2A:
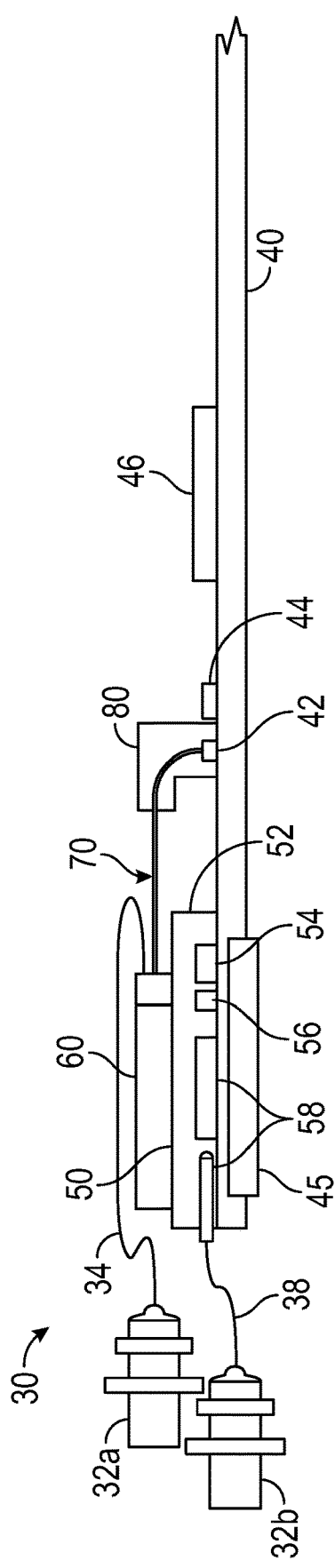
FIG. 2A illustrates a side view of a chip-on-board assembly of the present disclosure for a pluggable module.
Figure 2B:
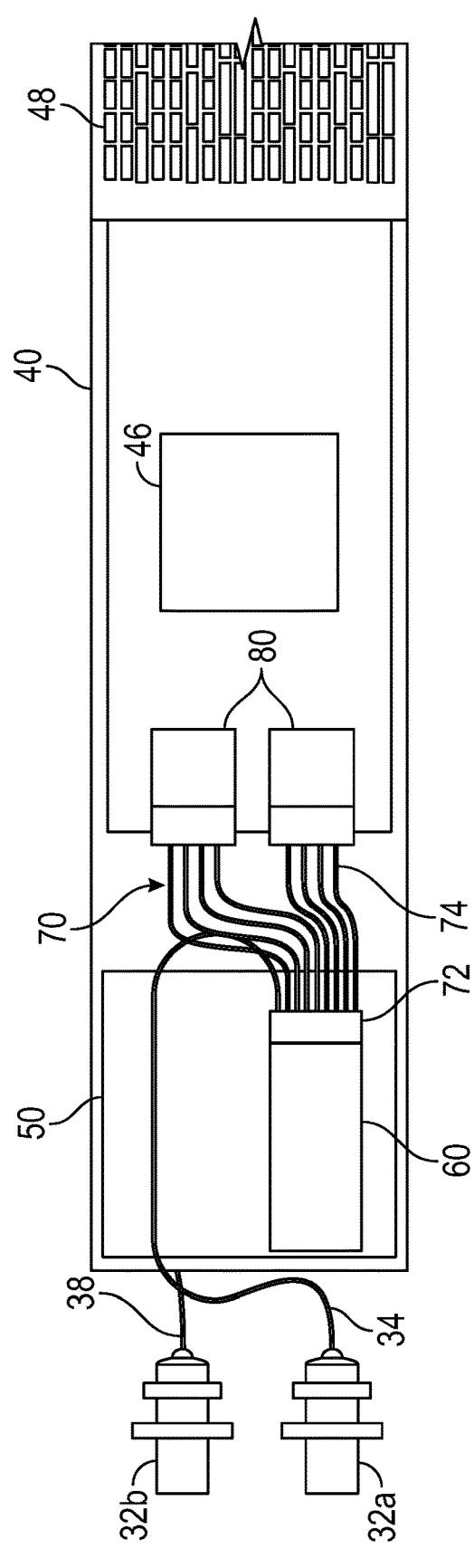
FIG. 2B illustrates a plan view of the assembly of FIG. 2A.

FIGS. 2A-2B illustrates a side view and a plan view of a chip-on board transceiver assembly 30 for use in a module. As part of a chip-on-board module, the transceiver assembly 30 includes receptacles 32a-b, fibers 34, 38, a circuit board 40, an optical transmitter subassembly 50, and an optical receiver subassembly, which includes a PLC chip 60, a fiber array 70, and on-board connectors 80 for optoelectronic components on the circuit board 40.

In general and as already noted, the transceiver assembly 30 can be part of a pluggable module, such as shown in FIG. 1 used with a cage for a connector. The transceiver assembly 30 is enclosed in a housing (12: FIG. 1) along with other conventional components of a pluggable module. Particular form factors are available and can be used. Accordingly, the circuit board 40 and other components contained in the housing (12) are constrained by the dimensions of the form factor so all of the components can be used with a pluggable module as noted herein.

The receptacles 32a-b are used for connection to optical fibers in the optical network. One fiber 34 connects optical signals received from the receptacle 32a to the PLC chip 60, whereas the other fiber 38 conveys transmitted optical signals from the transmitter 50 to the other receptacle 32b.

The PLC chip 60 includes a planar arrangement of waveguides on a substrate used for the fiber-optic communications. For example, the PLC chip 60 can have a number of different components, such as splitters, arrayed waveguide grating routers, multiplexers, filters and the like, which can be integrated on a single chip. In use, the PLC 60 can perform various functions, including wavelength filtering, optical switching, and optical channel power control.

The transceiver assembly 30 functions as a receiver for input light of an optical signal carrying input data traveling along an optical fiber (not shown) to the receptacle 32a. The input fiber 34 from the receptacle 32a conveys the input optical signal to the PLC chip 60. Internally, the PCL chip 60 may include an input waveguide for a demultiplexer structure to a plurality of output waveguides or ports. This input waveguide is aligned and affixed to a capillary structure of the input fiber 34 using known techniques. The output waveguides or ports are aligned and communicate with the fiber array 70.

From the PLC chip 60, the fiber array 70 can communicate the optical signals with optoelectronic devices 42 (e.g., input photodetectors 42) mounted on the printed circuit board 40. In particular, the fiber array 70 communicates to the input photodetectors 42 mounted on the printed circuit board 40. The photodetectors 42, which can be part of one or more photodetector arrays of receiver components, convert the optical signals to electrical signals. Transimpedance amplifiers (TIA) 44 then amplify the electrical signals, which are processed by a digital signal processor 46 and other conventional circuitry (not shown). The electronics are connected in electrical communication with a paddle card 48 on the circuit board 40. As conventionally done, the paddle card 48 can insert in a connector and can interface with the electrical connections for a host device.

The transceiver assembly 30 also functions as a transmitter for output light of an optical signal carrying output data to travel along an optical fiber (not shown) connected to the other receptacle 32b. As shown, the transmitter 50 includes a cover 52 covering internal transmission optics 54, which can include optoelectronic device (e.g., laser emitters), lenses, and the like.

The PLC chip 60 is disposed on the transmitter 50, and more particularly the PLC chip 60 is attached to or floats on the cover 52, which conserves space on the printed circuit board 40. The placement is further advantageous because the PLC chip 60 can be mounted separated from, but above, the transmission optics, which may generate heat. Likewise, the PLC chip 60 can be mounted apart from the electronics on the circuit board 40, which can also generate heat and could produce interference or other issues with the operation of the chip 60.

Internally, the transmitter 50 can include lasers 54, lenses 56, and combining optics 58 for transmission. These transmission optics image output optical data signals to the fiber 38 for the output receptacle 32*b*. A heat sink 45 can be placed adjacent these transceiver components. As shown in FIG. 2A, the PLC chip 60 on the cover 52 does not interfere with the heat dissipation offered by the heat sink 45.

As can be seen, all of the components of the transceiver assembly 30 are constrained by the dimensions of the form factor for a pluggable module. Therefore, all of the components (i.e., transmitter subassembly (50, 52, 54, 56, 58), receiver subassembly (60, 70, 80), photodetectors (42), amplifiers (44), digital signal processor (46), paddle card (48), etc.) compete for portions of the fixed surface area available on the circuit board 40. In general, the electronics require a first portion (A) of the fixed surface area, the transmitter subassembly 50 requires a second portion (B), the receiver subassembly requires a third portion (C), the paddle card 48 requires a fourth portion (D) of the fixed surface area, etc.

Due to their size, layout, and issues with electrical crosstalk and the like, for example, the photodetectors 42 and transimpedance amplifiers 44 require a particular spacing between one another. The fiber array 70 has a plurality of optical fibers 74 connected between (i) a first connector 72 at the PLC chip 60 and (ii) at least one second connector 80 at the circuit board 40. The first connector 72 is connected to the PLC chip 60 and has a first pitch between the optical fibers 74. This first connector 72 can be butt-coupled to the PLC chip 60 or coupled in another known manner. Either way, the ends of the optical fibers 74 can communicate with optical ports (e.g., internal waveguides) of the PLC chip 60. (The first connector 72 may also couple to the input fiber 34 and communicate input optical signals with an input port or waveguide of the PLC chip 60.)

The at least one second connector 80 is mounted on the circuit board 40 adjacent the photodetectors 42 and has a second pitch between the optical fibers 74. The second pitch is greater than the first pitch and is configured to the particular spacing for the photodetectors 42 and transimpedance amplifiers 44.

As disclosed in more detail below, the at least one second connector 80 can define a bend configured to bend the optical fibers 74 to the circuit board 40 so optical signals can be imaged onto the photodetectors 42. The bend would typically be 90-degrees so the optical signals can be perpendicular to the surface-mounted photodetectors 42.

Briefly, the at least one second connector 80 can be mounted to the circuit board 40 with an epoxy disposed between a first surface of the circuit board 40 adjacent the photodetectors 42 and a second surface of the at least one second connector 80. Other forms of connectors and/or forms of attachment can be used. In general, the fiber array 70 can include one or more connectors 80*a-b*, and each connector 80*a-b* can be mounted adjacent a respective array of the photodetectors 42 and amplifiers 44.

Figure 3A:
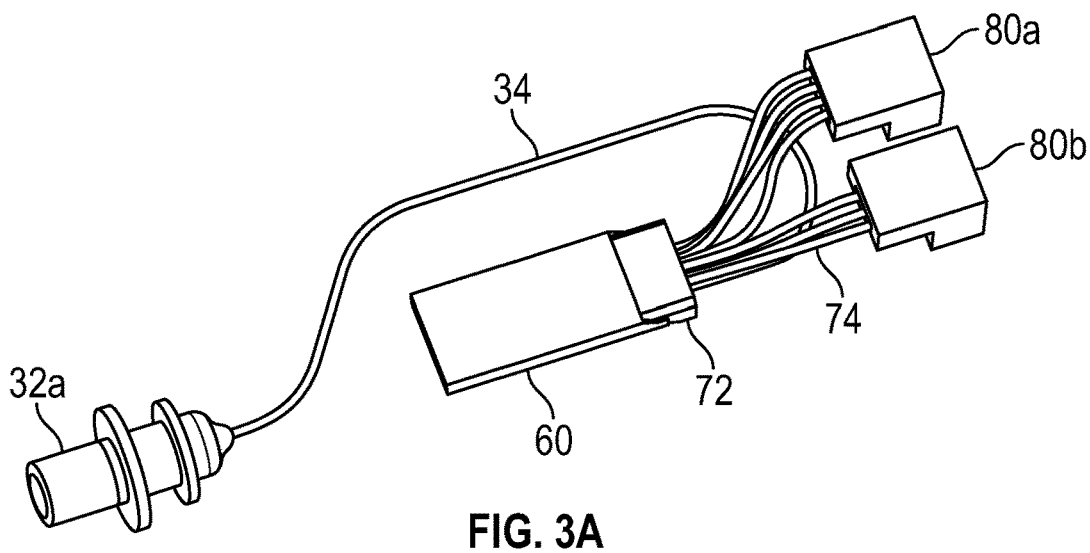
FIG. 3A illustrates components for the disclosed assembly in isolation.

FIG. 3A illustrates some components for the disclosed assembly in isolation, showing the PLC chip 60 and the pitch converting fiber array 70 having the fibers 74 between connectors 72 and 80*a-b*.

The pitch converting fiber array 70, with the fibers 74 bended by 90-degrees, has connectors 80*a-b* that are attached on the circuit board (40) to couple optical signals to the photodetectors (42) mounted on the circuit board (40). In this configuration, the on-board attachment area is significantly saved, which makes a high density COB arrangement suitable for an application with increased data rates, such as an 800 G application. Further, the pitches on two ends of the fiber array 70 can be varied to fit different arrays of photodetectors 42 and transimpedance amplifiers 44.

The pitch for the fiber array's connector 72 on the PLC chip 60 can be as small as 250-μm, which can reduce the size of the chip 60 and can lower its fabrication costs. Further, the pitch on the output side of the fiber array 70 can be the same as the pitch of an array of photodetectors 42 and amplifiers 44. For example, a given array may include a set of four adjacent photodetectors 42 connected to respective amplifiers 44. In conventional 100 G/200 G modules, 250-μm pitch PD/TIA is a common design. Here, however, for a higher data rate module, the TIA pitch may need to be as large as 750-μm to avoid performance degradation (crosstalk issues) between all of the adjacent electronics. If conventional designs were to be used, the pitch of PLC chip would need to follow 750-μm. This would make for a very large PLC chip for applications having increased data rates and would be impossible for practical application in a small form factor.

Instead, the fiber array 70 fans out from PLC chip 60 to match the 750×4 pitch of an array of photodetectors 42 and amplifiers 44 on the circuit board (40). The arrangement is flexible and can be configured as needed. The output pitch can vary to match different pitches for photodetectors and amplifiers that may be required.

Figure 3B:
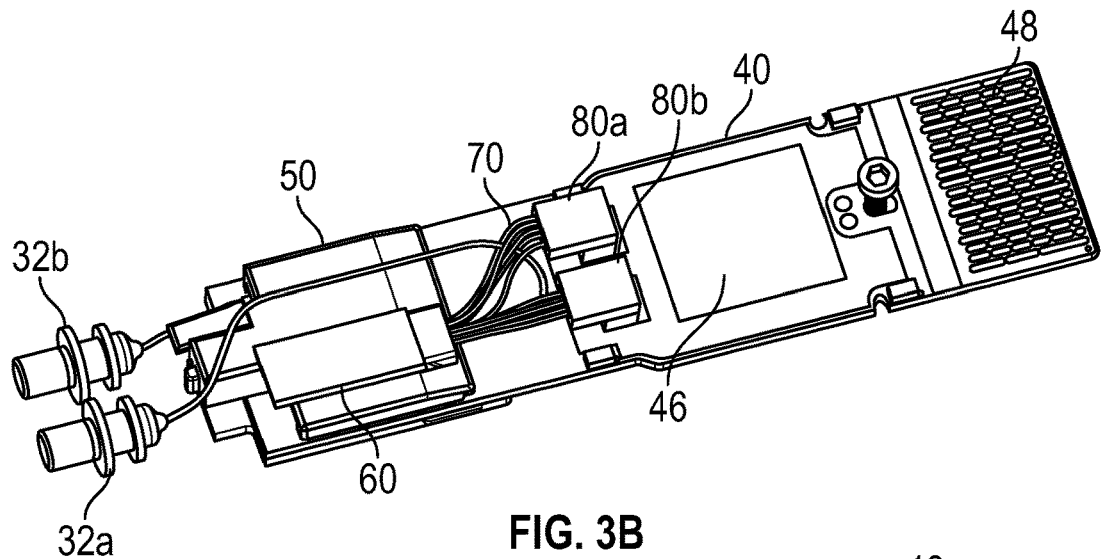
FIG. 3B illustrates a perspective view of another assembly of the present disclosure.
Figure 3C:
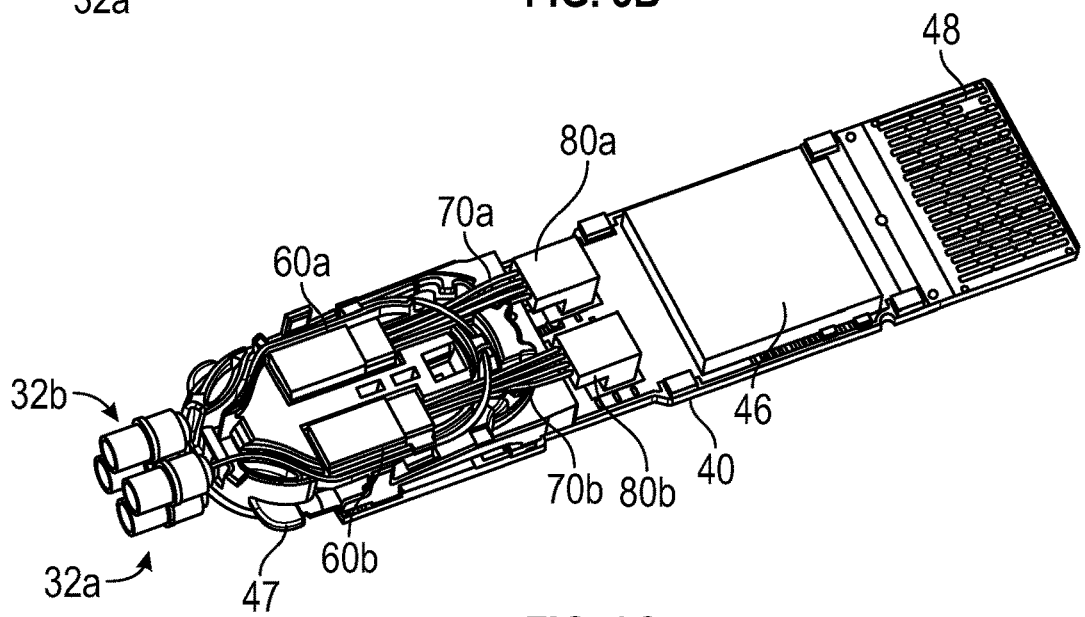
FIG. 3C illustrate a perspective view of yet another assembly of the present disclosure.

FIG. 3B illustrates a perspective view of an assembly 30 of the present disclosure. Here, one PLC chip 60 is disposed on the transmitter 50 and connects by a fiber array 70 to two connectors 80*a-b* on the circuit board 40. FIG. 3C illustrate a perspective view of an alternative assembly 30 of the present disclosure. In this configuration, two PLC chips 60*a-b* are disposed on the transmitter 50 and are connect by separate fiber arrays 70*a-b* to two connectors 80*a-b* on the circuit board 40. Each of the PCL chips 60*a-b* may have an input fiber pigtail, requiring two receptacles 32*a*. For symmetry, the transmitter 50 can likewise have two fiber pigtails connected to two receptacles 32*b*. To organize the fibers, the assembly 30 can include a tray 47 for winding and holding the fibers.

Figure 4:
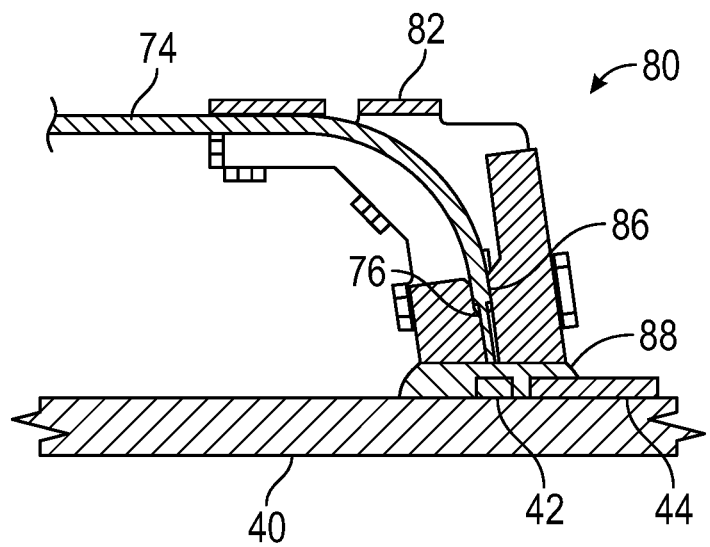
FIG. 4 illustrates a connector for connecting fibers from a fiber array adjacent photodetectors on a circuit board.

FIG. 4 illustrates an example of a connector 80 for connecting fibers 74 from the fiber array (70) to photodetectors 42 on the circuit board 40. In particular, FIG. 4 shows a detail of one way to attachment of the connector 80 and fibers 74 of the fiber array to the circuit board 40. The end of the fiber 74 is routed into a stem 82 of the connector 80, and the fiber 74 is turned into a guide 86, where the tip of the fiber 76 inserts with cladding removed. The connector 80 holds a group of such fibers 74 side-by-side. The tips 76 of the group of fibers 74 in the connector 80 are actively aligned with the array of photodetectors 42 on the circuit board 40, and then an epoxy 88 can be applied in between the connector 80 and circuit board 40 to secure the alignment. Other forms of aligning and affixing the ends of the fibers 74 adjacent the circuit board 40 can be used to image the fibers 74 with the photodetectors 42.

Figure 5A:
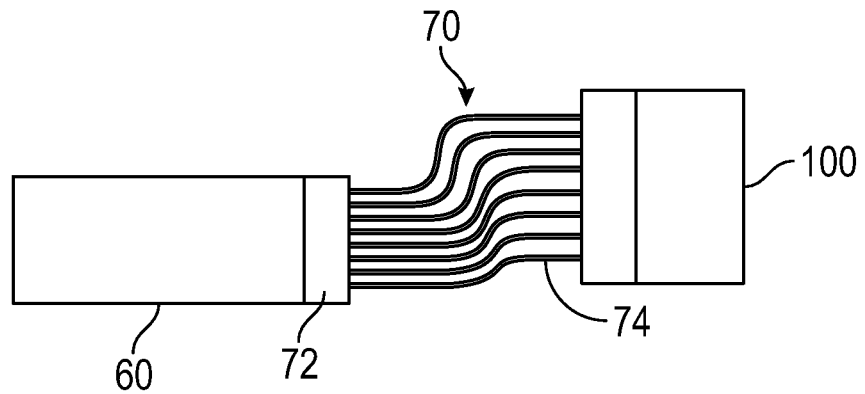
FIGS. 5A-5B illustrate plan views of alternative connector arrangements.

Instead of the two connectors 80*a-b* on the fiber array 70 as in the examples above, a singular on-board connector can be used, which can offer easier handling because only one active alignment is needed. As shown in the plan view of FIG. 5A, the PLC chip 60 connects to a fiber block 72 of the fiber array 70, which includes the fibers 74 that connect to a single on-board connector 100. The connector 100 can be used to affix and image the optical signals to the photodetectors (42) on the circuit board (40). This single on-board connector 100 can be similar in configuration as noted above, such as in FIG. 5A, but can be sized to accommodate the eight fibers 74 side-by-side at the appropriate pitch.

Figure 5B:
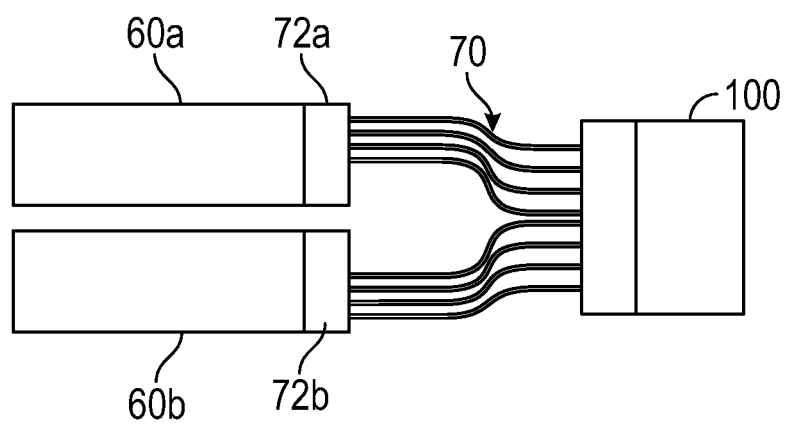

As further shown in FIG. 5B, another arrangement can include two PLC chips 60a-b connected by a fiber array 70 to a single on-board connector 100. This arrangement would preferably be used with an 8 channel array of photodetectors (42) and amplifiers (44) on the circuit board (40). Otherwise, a high resolution die bonding machine may be used to control the positioning of two separate 4-channel arrays on the circuit board (40).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

For example, although the PLC chip(s) (60) are mounted on the transmitter (50) and are used for routing input optical signals to photodetectors (42) mounted on the circuit board (40), a reverse arrangement can be used. In other words, the PLC chip(s) (60) can be mounted on a cover for the receiver components (42, etc.) and can be used for routing output optical signals from laser emitters and other components of the transmitter (50) mounted on the circuit board (40).

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An assembly used for communicating optical signals between a first optical port and a plurality of optoelectronic devices, the optoelectronic devices disposed at a spacing from one another, the assembly comprising:
   at least one planar lightwave circuit (PLC) chip in communication with the first optical port and having a plurality of second optical ports, the at least one PLC chip configured to route the optical signals between the first optical port and the second optical ports;
   at least one fiber array having a plurality of optical fibers and having first and second ends, the first end of the at least one fiber array connected to the second optical ports of the at least one PLC chip and having a first pitch between the optical fibers; and
   at least one connector disposed on the second end and being configured to mount adjacent the optoelectronic devices, the at least one connector having a second pitch between the optical fibers, the second pitch being greater than the first pitch and being configured to the spacing of the optoelectronic devices.

2. The assembly of claim 1, wherein the at least one connector comprises two of the at least one connector, each configured to mount adjacent a respective array of the optoelectronic devices.

3. The assembly of claim 1, wherein the at least one PLC chip comprises a single one of the at least one PLC chip, the single PLC chip having eight of the second optical ports in communication with the first end of the fiber array; and wherein the at least one fiber array comprises eight of the optical fibers connected to the at least one connector at the second end.

4. The assembly of claim 3, wherein the at least one connector comprises one of the at least one connector configured to mount adjacent an array having eight of the optoelectronic devices.

5. The assembly of claim 1, wherein the at least one PLC chip comprises first and second of the at least one PLC chip each having four of the second optical ports, each of the first and second PLC chips coupled to four of the optical fibers on the first end of the fiber array; and wherein the eight of the optical fibers are connected to the at least one connector at the second end.

6. The assembly of claim 5, wherein the at least one connector comprises one connector configured to mount adjacent an array having eight of the optoelectronic devices; or two connectors configured to mount adjacent two arrays each having four of the optoelectronic devices.

7. A module for communicating input and output optical signals of a network, the module comprising:
   a circuit board having electronics mounted therein, wherein the optoelectronic devices comprise a plurality of photodetectors mounted on the circuit board, the photodetectors being in electrical communication with the electronics and being configured to detect the input optical signals;
   a transmitter mounted on the circuit board, the transmitter being in electrical communication with the electronics and being configured to transmit the output optical signals;
   the assembly of claim 1, wherein the PLC is disposed above the transmitter and being configured to route the input optical signals for the photodetectors the second pitch is configured to the spacing of the photodetectors.

8. The module of claim 7, wherein the first end of the at least one fiber array comprises at least one first connector coupled to the at least one PLC chip.

9. The module of claim 7, wherein the at least one connector disposed on the second end comprises at least one second connector mounted above the photodetectors.

10. The module of claim 9, wherein the at least one second connector comprises two of the at least one second connector, each mounted adjacent a respective array of the photodetectors.

11. The module of claim 7, wherein the at least one PLC chip comprises a single one of the at least one PLC chip, the single PLC chip having eight optical outputs coupled to a first connector on the first end of the fiber array; and wherein the at least one fiber array comprises eight of the optical fibers connected between the first connector and at least one second connector at the second end.

12. The module of claim 11, wherein the at least one second connector comprises one of the at least one second connector mounted adjacent an array having eight of the photodetectors; or two of the at least one second connector each mounted adjacent one of two arrays each having four of the photodetectors.

13. The module of claim 7, wherein the at least one PLC chip comprises first and second of the at least one PLC chip each having four optical outputs, each of the first and second PLC chips coupled to a first connector on the first end of the fiber array; and wherein the at least one fiber array comprises eight of the optical fibers connected between the first connectors and at least one second connector at the second end.

14. The module of claim 12, wherein the at least one second connector comprises one of the at least one second connector mounted adjacent an array having eight of the photodetectors; or two of the at least one second connector mounted adjacent two arrays each having four of the photodetectors.

15. The module of claim 7, wherein each of the photodetectors is connected to a respective transimpedance amplifier arranged on the circuit board at a defined spacing, the defined spacing being preventative of cross-talk between the transimpedance amplifiers.

16. The module of claim 7, further comprising a housing being constrained by dimensions of a form factor, wherein the circuit board has a fixed surface area, the fixed surface area being constrained by the dimensions of the form factor, the circuit board having electronics mounted on a first portion of the fixed surface area, wherein the electronics on the circuit board are connected in electrical communication with a paddle card, the paddle card disposed on a portion of the fixed surface area.

17. The module of claim 7, wherein the at least one connector defines a bend configured to bend the optical fibers perpendicular to the circuit board.

18. The module of claim 7, wherein the at least one connector comprises two connectors, each mounted adjacent a respective array of the photodetectors.

19. The module of claim 7, wherein the at least one PLC chip comprises a single one of the at least one PLC chip, the single PLC chip having eight optical ports coupled to the first end of the fiber array; wherein the at least one fiber array comprises eight of the optical fibers connected between the eight optical ports and the at least one connector; and wherein the at least one connector comprises one connector mounted adjacent an array having eight of the photodetectors; or two connectors mounted adjacent two arrays each having four of the photodetectors.

20. The assembly transceiver of claim 7, wherein the at least one PLC chip comprises first and second of the at least one PLC chip each having four optical ports, each of the first and second PLC chips coupled to the first end of the fiber array; wherein the at least one fiber array comprises eight of the optical fibers connected between the first and second PLC chips and the at least one connector; and wherein the at least one connector comprises one of the at least one connector mounted adjacent an array having eight of the photodetectors; or two of the at least one connector each mounted adjacent one of two arrays each having four of the photodetectors.

* * * * *